Oct. 24, 1967   J. R. BAKER ET AL   3,348,995
METHOD OF COATING METAL SURFACES WITH POLYETHYLENE UTILIZING
A POLYETHYLENE PRIMER AND ARTICLES PRODUCED THEREBY
Filed March 9, 1964
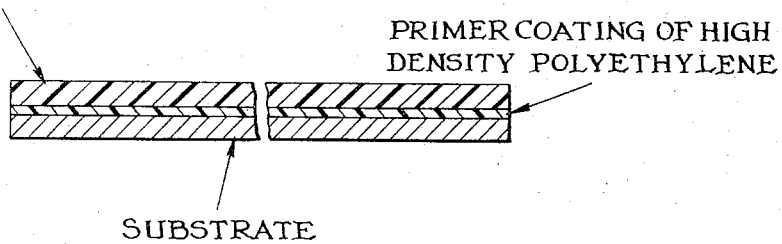
FINISH COATING OF LOW OR MEDIUM DENSITY POLYETHYLENE
PRIMER COATING OF HIGH DENSITY POLYETHYLENE
SUBSTRATE
INVENTORS
JAMES R. BAKER
EDWIN H. PHELPS
BY Cameron, Kerkam & Sutton
ATTORNEYS 3,348,995
METHOD OF COATING METAL SURFACES WITH POLYETHYLENE UTILIZING A POLYETHYLENE PRIMER AND ARTICLES PRODUCED THEREBY
James R. Baker and Edwin H. Phelps, Birmingham, Ala., assignors to American Cast Iron Pipe Company, Birmingham, Ala., a corporation of Georgia
Filed Mar. 9, 1964, Ser. No. 350,321
24 Claims. (Cl. 161—216)

ABSTRACT OF THE DISCLOSURE

The adhesion to metal of polyethylene, density range of 0.910 to 0.940, is improved by the use of a thin high density polyethylene primer coat, density range of 0.941 to 0.965. The application of as much as a 5 mil layer of polyethylene of 0.941 to 0.956 density to a metal heated to a temperature of at least 500° F. and the subsequent application to the hot metal of a lower density polyethylene layer of greater thickness causes adhesion of the polyethylene layers to the metal. The temperature of the primer coat must be sufficient to melt the top coat.

---

This invention relates generally to a method of preparing coated articles and to articles produced thereby, and more particularly to an improved method of applying polyethylene coatings to metal surfaces to provide articles having strongly adherent protective coatings of polyethylene.

Many articles, particularly metal articles such as sheet metal and pipes, are coated with resinous materials to improve the surface characteristics thereof and to protect the material of the body of the article from corrosive environments. Polyethylene has been used to provide such a coating and has found use in many applications; however, a strongly adhesive polyethylene coating on metal is difficult to achieve. Known methods produce coatings which are not dependable because the coatings are subject to cracking or stripping which exposes the substrate or body of the article to the corrosive environment in which the article is used.

Numerous attempts have been made to improve the adhesion between polyethylene coatings and metal surfaces which have had limited degrees of success. However, in all known prior methods for improving the adhesion of polyethylene to metals, there is generally required the use of various chemicals or a complex chemical process for surface preparation of the metal, the application of a primer coat, and curing of the final coating. For example, to overcome the effect of cracking in high density polyethylene coatings on steel pipes which occurs due to stresses, it has been proposed to use an adhesive mastic layer between the polyethylene coating and the pipe. Although the use of such a mastic layer permits movement of the polyethylene coating without cracking, this method has the disadvantage that the polyethylene coating is easily stripped from the steel pipe.

Another procedure which has improved the adhesion of polyethylene to metals involves the application of a molecular film of stearic acid to the metal substrate before the polyethylene coating is applied. Although the adhesion of the polyethylene coating is improved, this process has the disadvantage of being costly, time consuming and difficult to control. In U.S. Patent No. 3,057,746, the material to be coated is pre-treated by the application of an epoxy resin and then coated with a layer of polyethylene which has previously been subjected to chlorination. Such a method increases considerably the cost of obtaining an effective coating due to the additional materials utilized and the chemical process necessary for preparation of the materials.

By the present invention, we have provided an economical method which produces excellent adhesion between polyethylene coatings and metal surfaces, and an extremely durable coating. The metals require no special surface preparation other than the removal of any loose foreign matter, and there is no necessity for using complicated chemical processes in the preparation of either the primer coat or the finish coat.

Accordingly, it is a primary object of the present invention to provide an improved method for coating metal surfaces with polyethylene which is simple and economical to practice, and which produces metal articles having extremely durable coatings of polyethylene.

A further object of the invention is to provide a method of producing metal articles having strongly adhering coatings of polyethylene wherein the polyethylene can be applied in many different ways, as by a fluidized bed, spray, a vibrating screen, pouring, or in the form of thin films or sheets.

These and other objects and advantages of the invention will be apparent from the following description taken in connection with the drawing and the appended claims which particularly point out and distinctly claim the subject matter of the invention.

We have discovered that polyethylene coatings on metal substrates will be substantially more adherent and not subject to cracking or stripping if the surface to be coated is first provided with a thin layer of high density polyethylene which is bonded to the surface and to which is then bonded a thicker layer of either low or medium density polyethylene. The thin layer of high density polyethylene serves as a primer coat or adhesive for the thicker layer of low or medium density polyethylene.

It has been found that the effectiveness of the bond is characterized by the density or specific gravity of the particular material used. Accordingly, when reference is made to a high density polyethylene material, it is meant to refer to those polyethylene materials having a density or specific gravity of from 0.941 to 0.965, and a melt index of from 0.2 to 5. A medium density polyethylene material is one having a density or specific gravity in the range of from 0.926 to 0.940, and a melt index of from 0.3 to 22, while a low density polyethylene material is one having a density or specific gravity of from 0.910 to 0.925 and a melt index of from 0.3 to 22.

The invention may be practiced with many commercially available polyethylene materials such as, for example, W. R. Grace & Company's high density polyethylene powder C–1–002, U.S. Industrial Chemical Company's high density polyethylene powder 711–945, and U.S. Industrial Chemical Company's low density polyethylene powder 710–228.

Such materials are available with varying melt indices from 0.2 to 22 and in various particle sizes. Although the melt index and the particle size of the polyethylene materials used in carrying out the method of the invention are not critical to achieving an effective bond, they are related to the thickness of the coating desired and to the conditions under which the polyethylene materials are applied. When using powdered polyethylene, the particle size can be varied without affecting the quality of the bond, and particle sizes of from 20 to 150 mesh give excellent results. It will be understood that, when reference is made to a particle size of a specific mesh, for example, 50 mesh, what is meant is that the particles are capable of passing a 50 mesh screen. A thin coating normally requires a finer particle size than would a thicker coating, and a low melt index material requires a finer particle size than a high melt index material. Thin sheets or films of polyethylene may also be used instead of powdered polyethylene. In either case, however, the primer coat of high density polyethylene is held to a thickness of from about 0.1 to 5 mils, while the finish coat is preferably thicker, having a thickness in the range of from about 5 to 50 mils. The finish coat may be of either a low density or a medium density polyethylene, and, if desired, may be a mixture of both.

When operating according to the present invention, the metal substrate to be coated, after it has been cleaned to remove any loose foreign matter, is heated to a temperature sufficient to melt a high density polyethylene powder and to effect a bond between said powder and the metal substrate. Although the exact temperature is dependent to some extent upon the properties of the specific polyethylene material being used, it has been found that, unless the primer coat of high density polyethylene is subjected to a temperature of at least 500° F., it will not be well bonded to the metal. The substrate should therefore be maintained at a temperature in the range of from about 500° F. to about 550° F. during application of the primer coat. A primer coat of high density polyethylene powder approximately 0.1 to 5 mils in thickness is then applied to the heated substrate by any suitable method, as by sifting, sprinkling, fluidized bed, spraying, or if desired, the powdered polyethylene may be formed into a sheet before it is applied. After the primer coat of high density polyethylene has been formed, and preferably while it is still molten, a finish coat of low or medium density polyethylene of a thickness of approximately 5 to 50 mils is applied thereto in any suitable manner. During application of the finish coat, the metal substrate is maintained at a temperature of at least 350° F., the exact temperature depending upon the melting point of the polyethylene used. In each case, however, the metal should be maintained at a temperature sufficient to melt the specific type of polyethylene used and to keep it molten until the metal has been completely covered and a coating of the desired thickness has been formed. The coated metal may then be cooled in any suitable manner, as by air cooling, flooding with water, plunging into a water bath, or any other appropriate procedure that does not disturb the applied coating.

To demonstrate the improved adhesive properties obtained by the present invention, tests were made of several different metal articles having various types of coatings of high and low density polyethylene applied under varying conditions. For example, the upper portions of five different metal plates, i.e., aluminum, copper, steel, stainless steel and galvanized steel, were coated with only a layer of U.S. Industrial Chemical Company's low density polyethylene 710–228, while the lower portion of each plate was coated first with a primer coat of W. R. Grace & Company's high density polyethylene C–1–002 and then with a finish coat of U.S. Industrial Chemical Company's low density polyethylene 710–228. The coating was easily stripped from that portion of each plate which did not have a primer coating of high density polyethylene, but when the primed area was reached, the coating was torn and could not be peeled away from the plate.

In a second test, three steel pipes were individually coated by sprinkling with powdered polyethylene while the pipe was rotated and maintained at a temperature greater than 500° F. One pipe was coated with a high density polyethylene only, the second pipe was coated with a low density polyethylene only, and the third pipe was provided with a thin primer coat of high density polyethylene and a thicker finish coat of low density polyethylene. The three pipes were then subjected to twelve weeks of outdoor exposure, after which it was found that the coating of high density polyethylene only had cracked and showed a tendency to separate from the metal, the coating of low density polyethylene only, while not cracking or separating, could be easily stripped from the metal, while the coating of the pipe that was primed with a thin high density polyethylene layer and then coated with a low density polyethylene did not crack or separate and could not be stripped.

While these tests demonstrated conclusively the improved adhesive properties of the polyethylene coatings prepared in accordance with the present invention, several other tests were conducted which established the necessity for melting of the primer coat in order to establish an effective bond. In these tests, a steel plate was heated at one end so that the temperature along the plate varied from 550° F. to 300° F. A primer coat of high density polyethylene powder having a thickness of 2 to 5 mils was then sprinkled on the plate and allowed to melt. Then a finish coat of low density polyethylene powder having a thickness of 30 to 40 mils was applied and allowed to melt. The adherence of the polyethylene to the steel plate at the various temperature zones was tested and found to be as follows:

| Temperature of plate (° F.): | Character of bond |
|---|---|
| 350 | None. |
| 400 | Slight. |
| 450 | Non-uniform. |
| 500 | Good. |
| 550 | Excellent. |

Repetitions of this test produced similar results and demonstrated that a temperature of at least 500° F. is necessary in order to effectively bond high density polyethylene to metal, and that complete melting of the polyethylene layers at the junction or interface therebetween is essential to bonding of the finish coat to the primer coat. If the primer coat is applied at a minimum temperature of 500° F. and then allowed to cool to approximately 350° F., the finish coat will bond thereto.

The following examples are illustrative of the method of the present invention, but are not intended to represent the full scope of the inventive concept which is defined in the appended claims.

EXAMPLE 1

A six inch steel pipe, 20 feet long, with a metal thickness of 0.188 inch was heated in an oven to approximately 550° F. A primer coat of high density polyethylene powder having a particle size of 50 mesh, a specific gravity of 0.953 and a melt index of 4.17 was applied to the hot pipe by spraying for a period of 1 minute while the pipe was rotated. The spray was started at one end of the pipe, and by the time the opposite end of the pipe was reached, the freshly applied layer had formed a primer coat of 2 to 4 mils in thickness and had melted sufficiently so that the second layer or finish coat could be applied immediately and would stick. A finish coat of low density polyethylene powder having a particle size of 50 mesh, a specific gravity of 0.915 and a melt index of 22 was then sprayed onto the primer coat while the pipe was maintained at a temperature of approximately 500° F., approximately 4 minutes being required to build up a finish coat of approximately 40 mils thickness. After application of the finish coat, the pipe was cooled to room temperature (70° F.) by flowing water through it for approximately 3 minutes. The water flow was started approximately 2 minutes after the finish coat was applied, so that the time required for application of the coating was only about 10 minutes. Table 1 summarizes the characteristics of the materials used in, and the operating conditions of, the method of Example 1 which produced a highly durable coating that did not crack and could not be stripped from the substrate to which it was applied.

TABLE 1

| Coat | Specific Gravity (Density) | Melt Index | Particle Size (Mesh) | Metal Temp. (° F.) | Thickness (Mils) | Application Time |
|---|---|---|---|---|---|---|
| Primer | 0.953 | 4.17 | 50 | 550 | 2–4 | 1 min. |
| Finish | 0.915 | 22 | 50 | 500 | 40 | 4 min. |

EXAMPLE 2

An aluminum sheet with a metal thickness of 0.0625 inch was heated to a temperature of 500° F. A high density polyethylene powder having a particle size of 35 mesh, a specific gravity of 0.950 and a melt index of 4.17 was then sprinkled on the heated sheet for approximately 10 seconds to form a primer coat of about 5 mils thickness. A low density polyethylene powder having a particle size of 35 mesh, a specific gravity of 0.932 and a melt index of 8 was then applied by sprinkling for approximately 12 seconds so as to provide a finish coat of about 15 mils thickness. The metal sheet was maintained at a temperature of about 460° F. during application of the finish coat, after which it was allowed to air cool to room temperature in 15 minutes. Table 2 summarizes the method set forth in Example 2 wherein the resultant coating evidenced excellent adhesion characteristics and was not subject to cracking or stripping.

TABLE 2

| Coat | Specific Gravity (Density) | Melt Index | Particle Size (Mesh) | Metal Temp. (° F.) | Thickness (Mils) | Application Time |
|---|---|---|---|---|---|---|
| Primer | 0.950 | 4.17 | 35 | 500 | 5 | 10 sec. |
| Finish | 0.932 | 8 | 35 | 460 | 15 | 12 sec. |

EXAMPLE 3

In this example, a sheet of low density polyethylene was used for the finish coat. A galvanized steel panel of 0.03 inch thickness was heated to a temperature of 600° F., and a high density polyethylene powder having a particle size of 50 mesh, a specific gravity of 0.953 and a melt index of 4.17 was sprinkled on the heated panel. The application time was approximately 5 seconds to provide a primer coat of approximately 5 mils thickness. A sheet of low density polyethylene having a specific gravity of 0.915 and a melt index of 22 was then pressed onto the melted layer of high density polyethylene for about 10 seconds. The temperature of the steel panel was maintained at approximately 350° F. while the sheet was pressed, and the coated panel was thereafter air cooled to room temperature in 20 minutes. The resulting coating was found to have excellent adhesive properties indistinguishable from those obtained when a low density polyethylene powder was used for the finish coat. The method set forth in Example 3 is summarized in Table 3.

TABLE 3

| Coat | Specific Gravity (Density) | Melt Index | Particle Size (Mesh) | Metal Temp. (° F.) | Thickness (Mils) | Application Time |
|---|---|---|---|---|---|---|
| Primer | 0.953 | 4.17 | 50 | 600 | 5 | 5 sec. |
| Finish | 0.915 | 22 | Sheet | 350 | 8 | 10 sec. |

EXAMPLE 4

A steel panel of 0.0625 inch thickness was heated to 500° F. and was prime coated to a thickness of 5 mils with the same high density polyethylene powder as that used in Example 3. A sheet of the same low density polyethylene material as that used in the preceding example, but of approximately 30 mils thickness, was pressed onto the melted primer coat to provide a finish coat. The temperatures and times involved were the same as those set forth in Table 3. This procedure was then repeated with a 0.25 inch thick low density polyethylene sheet of the same grade. In both instances, the coating exhibited excellent adhesion characteristics indistinguishable from those achieved when a powdered polyethylene material was used for the finish coat.

EXAMPLE 5

A steel panel of 0.0625 inch thickness was heated to a temperature of 50° F. and coated with a 5 mil thick sheet of high density polyethylene material having a specific gravity of 0.953 and a melt index of 4.17. The sheet was pressed onto the steel panel for a period of approximately 2 seconds, and then coated with a low density polyethylene powder having a particle size of 50 mesh, a specific gravity of 0.915 and a melt index of 22. The powder was applied by sprinkling for approximately 10 seconds to provide a finish coat of 50 mils thickness. As in the prior examples, the resultant coating exhibited excellent adhesion characteristics and was not subject to cracking or peeling. Table 4 presents in tabular form a summary of the method of Example 5.

TABLE 4

| Coat | Specific Gravity (Density) | Melt Index | Particle Size (Mesh) | Metal Temp. (° F.) | Thickness (Mils) | Application Time |
|---|---|---|---|---|---|---|
| Primer | 0.953 | 4.17 | Sheet | 500 | 5 | 2 sec. |
| Finish | 0.915 | 22 | 50 | 500 | 50 | 10 sec. |

EXAMPLE 6

A steel panel of 0.0625 inch thickness was primed with a layer of high density polyethylene powder having a particle size of 50 mesh, a specific gravity of 0.953 and a melt index of 4.17. The panel was heated to a temperature of approximately 500° F., and the powder was sprinkled thereon for approximately 2 seconds to provide a primer coat of 2 mil thickness. A finish coat of 25 mil thickness, consisting of equal parts by weight of low and medium density powders, was then applied by sprinkling for approximately 5 seconds. The low density polyethylene powder used had a particle size of 50 mesh, a specific gravity of 0.915 and a melt index of 22, while the medium density powder had a particle size of 35 mesh, a specific gravity of 0.932 and a melt index of 8. The temperature of the panel was maintained at about 500° F. during both sprinkling operations, after which the coated panel was cooled in a water bath for 3 seconds. The coating of the finished product had adhesive characteristics similar to those of the coatings of the preceding examples wherein only a low or a medium density polyethylene material was used for the finish coat. Table 5 summarizes the method of Example 6.

TABLE 5

| Coat | Specific Gravity (Density) | Melt Index | Particle Size (Mesh) | Metal Temp. (° F.) | Thickness (Mils) | Application Time |
|---|---|---|---|---|---|---|
| Primer | 0.953 | 4.17 | 50 | 500 | 2 | 2 sec. |
| Finish | 0.915 | 22 | 50 | 500 | 25 | 5 sec. |
| | 0.932 | 8 | 35 | | | |

Tables 6 and 7 are tabulations of data for the coating of a steel panel of 0.5 inch thickness in accordance with the methods hereinbefore described. Table 6 lists the data for the application of finish coats of low density polyethylene powders which differed only as respects particle size, and indicates the difference in application time required to produce equivalent coatings. Table 7 illustrates the temperature differential required to melt 16 and 50 mesh polyethylene powders of the same type in the same time.

TABLE 6

| Coat | Specific Gravity (Density) | Melt Index | Particle Size (Mesh) | Metal Temp. (° F.) | Thickness (Mils) | Application Time |
|---|---|---|---|---|---|---|
| Primer | 0.953 | 4.17 | 150 | 500 | 1 | 1 |
| Finish | 0.915 | 22 | 16 | 500 | 50 | 105 |
| Primer | 0.953 | 4.17 | 150 | 500 | 1 | 1 |
| Finish | 0.915 | 22 | 50 | 500 | 50 | 75 |

TABLE 7

| Coat | Specific Gravity (Density) | Melt Index | Particle Size (Mesh) | Metal Temp. (° F.) | Thickness (Mils) | Application Time |
|---|---|---|---|---|---|---|
| Primer | 0.953 | 4.17 | 150 | 500 | 1 | 1 |
| Finish | 0.915 | 22 | 16 | 500 | 48 | 100 |
| Primer | 0.953 | 4.17 | 150 | 500 | 1 | 1 |
| Finish | 0.915 | 22 | 50 | 450 | 48 | 100 |

While several specific embodiments of the invention have been described, it will be obvious to those skilled in the art that many modifications may be made in the details of the procedure and the characteristics of the materials used. It is therefore intended by the appended claims to cover all such modifications which fall within the true spirit and scope of the invention.

What is claimed is:

1. A method of coating metal surfaces with polyethylene comprising the steps of applying to a metal substrate a high density polyethylene material having a specific gravity in the range of 0.941 to 0.965 to form a first layer of predetermined thickness while maintaining said substrate at a temperature of at least 500° F. so as to melt the polyethylene material, and then applying to said first layer a lower density polyethylene material having a specific gravity in the range of 0.910 to 0.940 to form a second layer greater in thickness than said first layer while maintaining said substrate at a temperature of at least 350° F. and sufficient to effect complete melting of both of said layers at the junction therebetween.

2. A method as set forth in claim 1 wherein the thicknesses of said first and second layers of polyethylene material are from about 0.1 to about 5 mils, and from about 5 to about 50 mils, respectively.

3. A method as set forth in claim 1 wherein said second layer of polyethylene material has a specific gravity in the range of 0.926 to 0.940

4. A method as set forth in claim 1 wherein said second layer of polyethylene material has a specific gravity in the range of 0.910 to 0.925.

5. A method of coating metal surfaces with polyethylene comprising the steps of applying to a metal substrate a high density polyethylene material having a specific gravity in the range of 0.941 to 0.965 to form a first layer of from about 0.1 to about 5 mils in thickness while maintaining said substrate at a temperature in the range of from about 500° F. to about 550° F. so as to melt the polyethylene material, and then applying to said first layer a mixture of polyethylene materials having specific gravities in the range of 0.910 to 0.940 to form a second layer having a thickness greater than that of said first layer and in the range of from about 5 to about 50 mils while maintaining said substrate at a temperature of at least 350° F. and sufficient to effect complete melting of both of said layers at the junctions therebetween.

6. A method as set forth in claim 5, wherein said mixture of polyethylene materials comprises a low density polyethylene material having a specific gravity in the range of 0.910 to 0.925 and a medium density polyethylene material having a specific gravity in the range of 0.926 to 0.940.

7. A method of coating metal surfaces with polyethylene comprising the steps of applying to a metal substrate a first layer of a high desnity polyethylene material having a specific gravity in the range of 0.941 to 0.965 to form a primer coat having a thickness in the range of from about 0.1 to about 5 mils while maintaining said substrate at a temperature in the range of from about 500° F. to about 550° F. so as to melt said polyethylene material and effect bonding thereof to said substrate, and then applying to said primer coat a second layer of lower density polyethylene material having a specific gravity in the range of 0.910 to 0.940 to form a finish coat having a thickness greater than that of said first primer coat and in the range of from about 5 to about 50 mils while maintaining said substrate at a temperature in the range of from about 350° F. to about 550° F. to effect bonding of said second layer to said first layer by complete melting of both of said layers at the interface therebetween.

8. A method as set forth in claim 7 wherein said finish coat has a specific gravity in the range of 0.926 and 0.940.

9. A method as set forth in claim 7 wherein said finish coat has a specific gravity in the range of 0.910 to 0.925.

10. A method of coating metal surfaces with polyethylene comprising the steps of applying to a metal substrate a high density polyethylene material having a specific gravity in the range of 0.941 to 0.965 to form a primer coat having a thickness in the range of from about 0.1 to about 5 mils while maintaining said substrate at a temperature in the range of from about 500° F. to about 550° F., and then applying to said primer coat a mixture of low density and medium density polyethylene materials having specific gravities in the ranges of 0.910 to 0.925 and 0.926 to 0.940, respectively, to form a finish coat having a thickness greater than that of said primer coat and in the range of from about 5 to about 50 mils while maintaining said substrate at a temperature in the range of from about 350° F. to about 550° F. to effect complete melting of both said primer coat and said finish coat at the interface therebetween.

11. A method of coating metal surfaces with polyethylene comprising the steps of applying to a metal substrate a high density polyethylene material having a specific gravity in the range of 0.941 to 0.965 in the form of a sheet having a thickness in the range of from about 0.1 to about 5 mils to form a primer coat while maintaining said substrate at a temperature in the range of from about 500° F. to about 550° F. so as to melt the polyethylene sheet material and effect bonding thereof to the substrate, and then applying to said primer coat a layer of lower density powdered polyethylene material having a specific gravity in the range of 0.910 to 0.940 and a thickness greater than that of said primer coat and in the range of from about 5 to about 50 mils while maintaining said substrate at a temperature in the range of from about 350° F. to about 550° F. to effect bonding of said layer to said primer coat by complete melting of said layer and said primer coat at the interface therebetween.

12. A method as set forth in claim 11 wherein said layer of lower density polyethylene material comprises a mixture of low and medium density polyethylene powders having specific gravities in the ranges of 0.910 to 0.925 and 0.926 to 0.940, respectively.

13. A method of coating metal surfaces with polyethylene comprising the steps of applying to a metal substrate powdered polyethylene material having a specific gravity in the range of 0.940 to 0.965 to form a first layer having a thickness of from about 0.1 to about 5 mils while maintaining said substrate at a temperature of at least 500° F. so as to melt the powdered polyethylene material and effect bonding thereof to the substrate, and then applying to said first layer polyethylene material in the form of a sheet having a thickness greater than that of said first layer and in the range of from about 5 to about 50 mils and having a specific gravity in the range of 0.910 to 0.940 to form a second layer while maintaining said substrate at a temperature of at least 350° F. so as to effect bonding of said second layer to said first layer by complete melting of both of said layers at the interface therebetween.

14. A method of coating a metal substrate with polyethylene comprising the steps of heating the substrate to a temperature of at least 500° F., spraying the heated substrate with a high density polyethylene powder having a specic gravity of from 0.941 to 0.965 for a sufficient time to coat said substrate with a molten layer of said powder having a thickness in the range of from about 0.1 to about 5 mils, and then spraying a lower density polyethylene powder having a specific gravity in the range of 0.910 to 0.940 onto said molten layer for a sufficient time to provide a finish coat having a thickness greater than that of said molten layer and in the range of from about 5 to about 50 mils while maintaining the substrate at a temperature of at least 350° F. so as to effect complete melting of both the molten layer and the finish coat at the interface therebetween.

15. A method as set forth in claim 14 wherein said high density polyethylene powder has a particle size of from 20 to 150 mesh, and a melt index of from 0.2 to 5, and wherein said lower density polyethylene powder has a particle size of from 16 to 50 mesh, and a melt index of from 0.3 to 22.

16. A method of coating an aluminum article with polyethylene comprising the steps of heating said article to a temperature of at least 500° F., sprinkling onto said heated article a high density polyethylene powder having a specific gravity in the range of 0.941 to 0.965 for a sufficient time to provide a primer coat having a thickness in the range of from about 0.1 to about 5 mils, and then sprinkling a lower density polyethylene powder having a specific gravity in the range of 0.910 to 0.940 onto said primer coat for a sufficient time to provide a finish coat having a thickness greater than that of said primer coat and in the range of from about 5 to about 50 mils while maintaining said article at a temperature of at least 350° F. so as to effect complete melting of both of said coats at the interface therebetween.

17. A method as set forth in claim 16 wherein said high density powder has a particle size of 35 mesh, a melt index of 4.17 and a specific gravity of 0.950, and is sprinkled for approximately 10 seconds to provide a primer coat of approximately 5 mils in thickness, and wherein said lower density powder has a particle size of 35 mesh, a melt index of 8 and a specific gravity of 0.932, and is sprinkled for approximately 12 seconds while maintaining the article at a temperature of approximately 460° F. to provide a finish coat of approximately 15 mils in thickness.

18. A method of coating a steel article with polyethylene comprising the steps of heating said article to a temperature of at least 500° F., sprinkling onto said heated article a high density polyethylene powder having a particle size of 50 mesh, a melt index of 4.17 and a specific gravity of 0.953 for approximately 5 seconds to form a primer coat of approximately 5 mils in thickness, and then pressing on to said primer coat a sheet of low density polyethylene material having a thickness greater than that of said primer coat, a melt index of 22 and a specific gravity of 0.915 while maintaining the article at a temperature of at least 350° F. to effect bonding of said low density polyethylene sheet to said high density primer coat by complete melting of said sheet and said primer coat at the interface therebetween.

19. A method of coating a steel article with polyethylene comprising the steps of heating said article to a temperature of at least 500° F., pressing onto said article a sheet of high density polyethylene material having a thickness of approximately 5 mils, a melt index of 4.17 and a specific gravity of 0.953, and then sprinkling onto said articles a low density polyethylene powder having a particle size of 50 mesh, a melt index of 22 and a specific gravity of 0.915 for a sufficient time to form a coating of approximately 50 mils in thickness while maintaining the article at a temperature of at least 350° F.

20. A method of coating a metal substrate with polyethylene comprising the steps of heating said substrate to a temperature of at least 500° F., sprinkling onto said heated substrate a high density polyethylene powder having a specific gravity in the range of 0.941 to 0.965 for a sufficient time to provide a primer coat having a thickness in the range of from about 0.1 to about 5 mils, and then applying to said primer coat equal parts by weight of low density and medium density polyethylene powders having specific gravities in the ranges of 0.910 to 0.925 and 0.926 to 0.940, respectively, for a sufficient time to provide a finish coat having a thickness greater than that of said primer coat and in the range of from about 5 to about 50 mils while maintaining said substrate at a temperature of at least 350° F. so as to effect complete melting of both of said coats at the interface therebetween.

21. A method as set forth in claim 20 wherein said low density powder has a particle size of 50 mesh, a melt index of 22 and a specific gravity of 0.915, and said medium density powder has a particle size of 35 mesh, a melt index of 8 and a specific gravity of 0.932, said low and medium density powders being applied by sprinkling for approximately 5 seconds to provide a finish coat having a thickness of approximately 25 mils.

22. A polyethylene coated article comprising a metal substrate, a first layer consisting of high density polyethylene material having a specific gravity in the range of 0.941 to 0.965 bonded directly to said substrate and having a thickness in the range of from about 0.1 to about 5 mils, and a second layer consisting of low density polyethylene material having a specific gravity in the range of 0.910 to 0.925 bonded to said first layer and having a thickness greater than that of said first layer and in the range of from about 5 to about 50 mils.

23. A composite article comprising a metal substrate having a multi-layer polyethylene coating thereon, said coating including an inner layer consisting of polyethylene material adherent directly to said substrate having a specific gravity in the range of 0.941 to 0.965, and an outer layer consisting polyethylene material adherent directly to said inner layer having a specific gravity in the range of 0.910 and 0.940 and a thickness greater than that of said inner layer.

24. A composite article as set forth in claim 23 wherein said outer layer is formed from a mixture of low density and medium density polyethylene materials, having specific gravities in the range of 0.910 to 0.925 and 0.926 to 0.940, respectively.

References Cited
UNITED STATES PATENTS

| | | | |
|---|---|---|---|
| 2,697,058 | 12/1954 | Lasak | 117—132 X |
| 2,898,233 | 8/1959 | Hmiel | 117—103 |
| 2,907,671 | 10/1959 | Durivier | 117—16 |
| 3,022,194 | 2/1962 | Vollmer | 117—75 |
| 3,043,716 | 7/1962 | Busses et al. | 117—132 |
| 3,071,858 | 1/1963 | Alter | 117—161 X |

FOREIGN PATENTS

| | | |
|---|---|---|
| 561,041 | 7/1958 | Canada. |
| 823,175 | 11/1959 | Great Britain. |

OTHER REFERENCES

Sherwood, Peter W.: "Metal Finishing by Polyethylene Coating." Metal Finishing, July 1963.

WILLIAM D. MARTIN, *Primary Examiner.*

W. D. HERRICK, *Assistant Examiner.*